(12) United States Patent
Speigel et al.

(10) Patent No.: US 6,652,677 B2
(45) Date of Patent: Nov. 25, 2003

(54) PROCESS OF WELDING GAMMA PRIME-STRENGTHENED NICKEL-BASE SUPERALLOYS

(75) Inventors: Lyle B. Speigel, Niskayuna, NY (US); Raymond Alan White, Schenectady, NY (US); John Thomas Murphy, Niskayuna, NY (US); Daniel Anthony Nowak, Alplaus, NY (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 10/005,009

(22) Filed: Dec. 4, 2001

(65) Prior Publication Data

US 2003/0102061 A1 Jun. 5, 2003

(Under 37 CFR 1.47)

(51) Int. Cl.$^7$ .............................................. B23K 26/42
(52) U.S. Cl. ....................... 148/525; 148/527; 148/528; 228/193; 228/253
(58) Field of Search ................................. 148/522, 525, 148/527, 528; 228/193, 194, 253, 254

(56) References Cited

U.S. PATENT DOCUMENTS

| | | | | |
|---|---|---|---|---|
| 4,479,293 A | * | 10/1984 | Miller et al. | 148/527 |
| 4,722,469 A | * | 2/1988 | Rydstad et al. | 228/193 |
| 4,817,858 A | * | 4/1989 | Verpoort | 228/193 |
| 4,973,366 A | * | 11/1990 | Yasuda et al. | 148/527 |
| 5,916,384 A | * | 6/1999 | Das | 148/522 |
| 5,951,792 A | * | 9/1999 | Balbach et al. | 148/527 |
| 6,325,871 B1 | * | 12/2001 | Burke et al. | 148/522 |
| 2003/0062099 A1 | * | 4/2003 | Buergel et al. | 148/527 |

* cited by examiner

*Primary Examiner*—George Wyszomierski
(74) *Attorney, Agent, or Firm*—Ernest Cusick; Gary M. Hartman; Domenica N. S. Hartman

(57) ABSTRACT

A process for welding superalloys, and particularly articles formed of gamma prime-strengthened nickel-base superalloys whose chemistries and/or microstructures differ. The process entails forming the faying surface of at least one of the articles to have a cladding layer of a filler material. The filler material may have a composition that is different from both of the articles, or the same as one of the articles. The cladding layer is machined to promote mating of the faying surfaces, after which the faying surfaces are mated and the articles welded together. After cooling, the welded assembly is free of thermally-induced cracks.

21 Claims, 1 Drawing Sheet

PROCESS OF WELDING GAMMA PRIME-STRENGTHENED NICKEL-BASE SUPERALLOYS

STATEMENT REGARDING FEDERALLY SPONSORED RESEARCH

This invention was made with Government support under Contract No. DEFC2195MC31176 awarded by the Department of Energy. The Government has certain rights in the invention.

CROSS REFERENCE TO RELATED APPLICATIONS

Not applicable.

BACKGROUND OF THE INVENTION (1) Field of the Invention

This invention relates to welding methods for superalloys. More particularly, this invention is directed to a process for welding castings of nickel-base superalloys, and particularly gamma prime ($\gamma'$)-strengthened nickel-base superalloys, by which the occurrence of as-welded and post-weld heat treated cracking is reduced.

(2) Description of the Related Art

Nickel-base superalloys, such as gamma prime-strengthened nickel-base superalloys, are widely used to form certain high temperature components of gas turbine engines, including combustors and turbine nozzles (vanes) and buckets (blades). While high-temperature superalloy components can often be formed by a single casting, circumstances exist where superalloy components are preferably or are required to be fabricated by welding. As an example, in a high pressure turbine nozzle assembly in which the airfoils are formed of single-crystal (SX) superalloy and the inner and outer band castings are formed of a different superalloy or have a different microstructure, e.g., equiaxed, the airfoils would be assembled with the bands by welding or some other suitable method. Such components must generally be thermally stress-relieved after welding to relax residual stresses induced during cooldown following the welding operation. If formed of a gamma prime-strengthened nickel-base superalloy, heat treatment also provides stress relief by dissolution of a portion of the hardening gamma prime phase. Generally, the heat treatment parameters will vary depending on the superalloy composition, the amount of residual stress relief and dissolution required, furnace design, component geometry and many other factors.

Even if all appropriate precautions are taken, structural welds of gamma prime-strengthened nickel-base superalloy castings are known to form strain age cracks upon cooling from welding and post-weld heat treatment, such as during aging when the gamma prime phase is reprecipitated following solution heat treatment. The cause of these cracks is due at least in part to the residual stress produced during the welding and aging cycles. Cracking is particularly likely after welding castings formed of high gamma prime-strengthened nickel-base superalloys, which contain significant amounts (three weight percent or more) of aluminum and/or titanium. Aluminum and titanium are the primary elements forming the gamma prime phase that increases the strength, but also reduces the ductility, of nickel-base superalloys. High power levels can be required to weld such superalloys, which can promote cracking as a result of large volumes of the castings being consumed, creating high residual stresses from weld volume shrinkage, as well as higher levels of gamma prime formers in the weldment. The likelihood of cracking is further increased if the castings being welded are formed of dissimilar materials, e.g., with respect to chemistry, crystallography, coefficient of expansion, etc.

As a result of the tendency for cracking, components that must be fabricated by welding are often not formed of high gamma prime-strengthened nickel-base superalloys, but instead are formed from other high-temperature superalloys or are limited to being joined with fasteners or by brazing. However, the use of fasteners requires flanges, and brazing typically requires a large interface (faying surface), both of which result in increased weight. In addition, these assembly methods require machining operations that must be closely controlled in order to establish precise fit-up gaps. Finally, even if a crack-free weldment is successfully produced, various disadvantages can result, including a weak interface joint, a large joint gap, and compromised properties depending on the particular braze filler used.

In view of the above, it would be desirable if an improved process were available for welding nickel-base superalloys, particularly for the purpose of fabricating components formed of gamma prime-strengthened nickel-base superalloys.

BRIEF SUMMARY OF THE INVENTION

The present invention generally provides a process for welding nickel-base superalloys, and particularly articles formed of gamma prime-strengthened nickel-base superalloys whose chemistries and/or microstructures differ. The invention reduces the incidence of cracking during cooling from the welding operation and subsequent heat treatments, while also producing a strong interface joint whose mechanical properties can be near that of the superalloys from which the articles are formed.

The method of this invention generally entails preparing the faying surface of at least one of the articles to have a cladding layer of a filler material. Depending on the properties required of the final welded assembly, the filler material may have a composition that is different from both of the articles, or the same as one of the articles. The cladding layer is preferably machined to promote mating of the faying surfaces, after which the faying surfaces are mated and welded together.

According to the invention, the welded assembly is free of thermally-induced cracks following cooling from the welding temperature. The assembly also remains free of cracks following subsequent heat treatments. The crack-free welds made possible with the invention are attributed to the cladding layer, which has been shown to reduce the likelihood of thermally-induced cracks in welded components formed of high gamma prime-strengthened nickel-base superalloys for use in the most severe operating environments of a gas turbine engine. Cracking can be avoided where the articles welded together have dissimilar chemistries, e.g., low versus high gamma prime-strengthened nickel-base superalloys, and different microstructures, e.g., single crystal versus equiaxed. As a result, the present invention provides an improved process by which components having relatively complex geometries can be fabricated by welding together two or more articles formed of different superalloys.

Other objects and advantages of this invention will be better appreciated from the following detailed description.

DETAILED DESCRIPTION OF THE INVENTION

Figure 1:
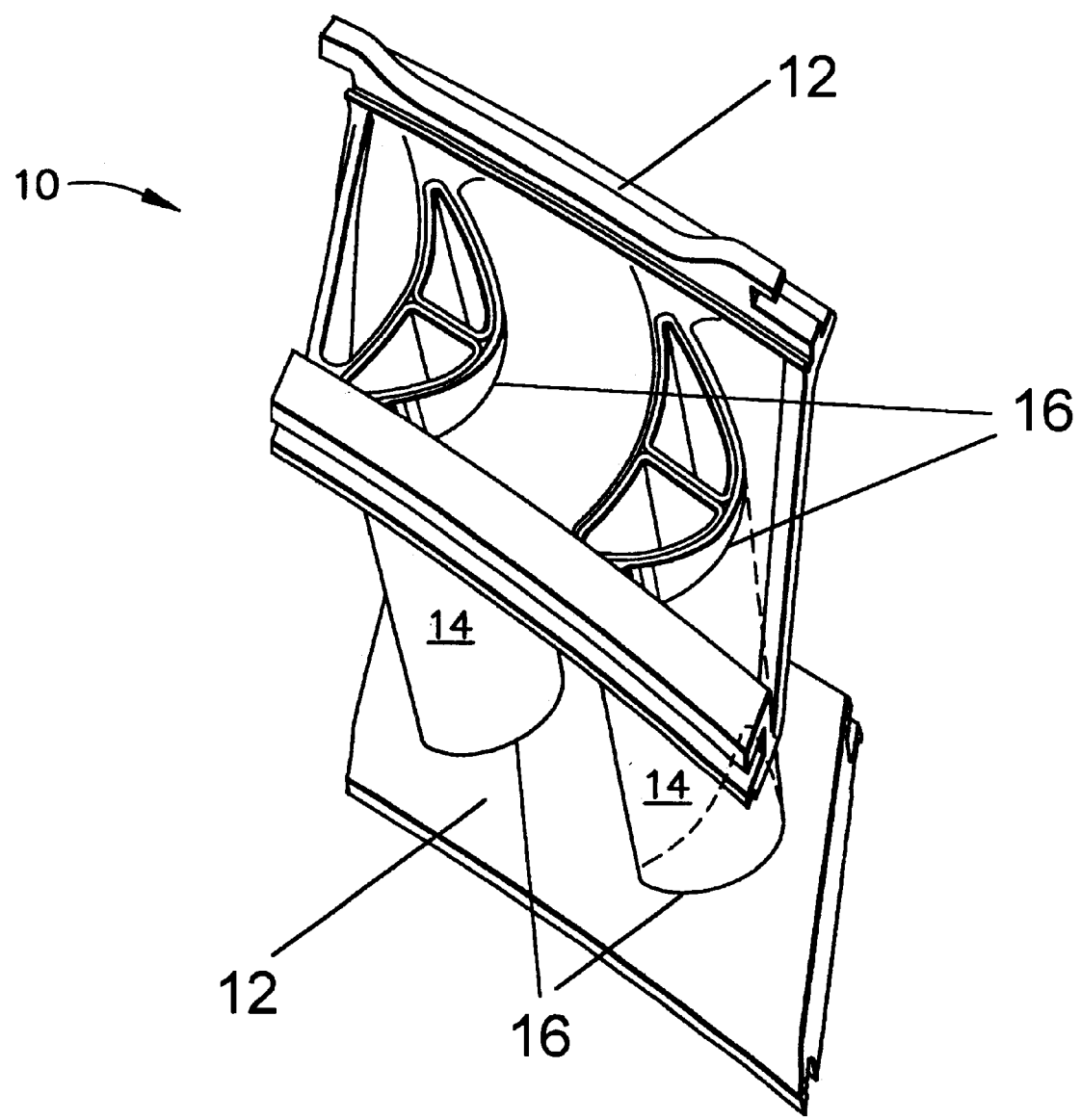
FIG. 1 is a perspective view of a turbine nozzle assembly of a gas turbine engine.

The invention will generally be described with specific reference to a welded turbine nozzle assembly of a gas turbine engine, in which the assembly comprises castings formed from different gamma prime-strengthened nickel-base superalloys. However, the invention has application to a variety of articles and superalloys other than those discussed, particularly where post-weld cracking is a problem.

FIG. 1 represents a gas turbine engine nozzle assembly 10 comprising a pair of airfoils 14 welded between inner and outer bands 12. The perimeter of each airfoil 14 is received within a corresponding opening formed in the bands 12, with welds being formed along the mutually-contacting faying surfaces 16 of the bands 12 and airfoils 14. Because of the hostile operating environment of the nozzle assembly 10, the bands 12 and the airfoils 14 are all preferably formed of superalloy materials. In a particular embodiment of the invention, the airfoils 14 are single-crystal castings formed of a high gamma prime-strengthened nickel-base superalloy, a notable example of which is René N5, while the bands 12 are equiaxed castings formed of a nickel-base superalloy with a lower gamma prime content. A is notable example of the latter alloy is GTD-222. The N5 alloy has a nominal composition, in weight percent, of 7.5% cobalt, 7.0% chromium, 6.5% tantalum, 6.2% aluminum, 5.0% tungsten, 3.0% rhenium, 1.5% molybdenum, 0.15% hafnium, 0.05% carbon, 0.004% boron, 0.01% yttrium, the balance nickel and incidental impurities. The GTD-222 alloy has a nominal composition, in weight percent, of about 22.5 chromium, about 14.0 cobalt, about 2.3 titanium, about 1.2 aluminum, about 2.0 tungsten, about 0.8 columbium, and about 1.0 tantalum, with the balance being nickel and incidental impurities.

High gamma prime-strengthened nickel-base superalloys such as the N5 superalloy are known to be difficult to weld without the occurrence of cracks developing in the weldment. The risk of cracks increases when attempting to weld a casting of such an alloy to a second casting formed of an alloy that differs in terms of chemistry, crystallography, coefficient of thermal expansion, etc. Because of the different chemistries and microstructures of the bands 12 and airfoils 14, weld joints formed to complete the assembly 10 are prone to cracking during cooldown from welding, as well as during cooling from subsequent thermal treatments. As a solution, the present invention forms one or both of the complementary faying surfaces 16 to comprise a cladding layer (not shown). The cladding layer is welded or otherwise metallurgically joined directly to the faying surface(s) 16, and is formed of a relatively weldable alloy, e.g., a superalloy that is more weldable than the least weldable of the superalloys of the bands 12 and airfoils 14. As such, the cladding layer may be formed of a superalloy that is the same as the alloy for either the bands 12 or the airfoils 14. In one embodiment, the faying surfaces 16 of the airfoils 14 are provided with cladding layers, and the cladding layers have the same composition as the bands 12. As an example, the airfoils 14 are formed of N5 while the cladding layers and bands 12 are formed of the more weldable GTD-222 alloy. Alternatively, the cladding layer may be formed of a superalloy that is different than the alloys for the bands 12 and airfoils 14. For example, if the bands 12 and/or airfoils 14 are formed of a gamma prime-strengthened nickel-base superalloy, the filler material may be a non-gamma prime-strengthened nickel-base superalloy, or a superalloy that is not nickel based, e.g., a cobalt-based superalloy.

The cladding layers are preferably applied to the entire faying surface. A suitable thickness for the cladding layers will vary depending on the particular application. For the nozzle assembly 10 represented in FIG. 1, a suitable thickness range is believed to be about 0.5 to 1 millimeter, more preferably about 0.8 to about 1.0 millimeter. Alternatively, the cladding layers may have a graded composition, with a thin layer of a more ductile nickel-base alloy applied to the faying surfaces 16 of the airfoils 14, followed by a layer of the higher strength GTD-222 superalloy. A suitable alloy for the more ductile layer is Alloy 625, applied to thicknesses of about 0.2 to about 0.45 millimeters, more preferably about 0.35 to about 0.45 millimeters.

The cladding layer is preferably applied by a low-dilution welding process, which results in the cladding alloy becoming at least partially diffused into the underlying surface. After the cladding operation, the casting on which the cladding layer was applied (e.g., an airfoil 14) preferably undergoes post-weld annealing to relieve stresses induced by the welding process. A suitable annealing treatment involves soaking the casting at a temperature of about 1000° C. for about two hours. The cladding layer is then preferably machined to ensure an accurate fit with the mating faying surface 16 of the second casting (e.g., a band 14). Suitable machining techniques for this purpose include grinding, milling, electrical-discharge machining (EDM), etc. Thereafter, the castings are assembled and then welded. Both the cladding and welding processes are preferably chosen to address those variables known to contribute to the propensity for defects, such as excessive heat input, weld volume and residual stresses, and dilution of the superalloy castings. In view of these considerations, a preferred cladding technique is plasma transferred arc (PTA) welding, while a preferred welding technique is laser welding using a beam focused to limit melting to primarily the cladding layer. It is foreseeable that other welding techniques could possibly be used.

In an investigation leading up to the invention, fifty coupons of René N5 were paired with GTD-222 coupons, each coupon having a thicknesses of about 2.5 and 5.0 mm. One of each coupon pair was cladded by plasma transferred arc welding with a 0.5 mm thick layer of Haynes 230 superalloy, having a nominal composition in weight percent of 22.0% chromium, 2.0% molybdenum, 14.0% tungsten 0.3% aluminum, 0.5% manganese, 0.4% silicon, 0.10% carbon, 0.02% lanthanum, the balance nickel. The coupons were then welded together by a high energy beam welding processes (laser and electron beam), such that melting was primarily limited to the cladding layer. After cooling, the resulting welds were found to be crack free. The specimens were then subjected to low cycle fatigue (LCF) testing at strains of up to about 1.0% at temperatures in the range of about 600° C. to about 1000° C. LCF lives for the specimens were in excess of one thousand cycles, which was more than five times greater than what had been achieved with identical coupons of N5 and GTD-222 joined by other known methods.

In a second investigation, pairs of N5 and GTD-222 coupons and N5/GTD-222 nozzle assemblies of the type shown in FIG. 1 were cladded with IN617, which has a nominal composition in weight percent of 22% chromium, 12.5% cobalt, 9.0% molybdenum, 1.0% aluminum, 0.3% titanium, 0.07% carbon, the balance nickel. The coupons and castings were then welded by plasma transferred arc. As with the test specimens of the previous investigation, the resulting welds were found to be crack-free after cooling from the welding operation. The specimens were then subjected to LCF testing, with the result that the LCF lives of the specimens exceeded by a factor of more than five what had been previously achieved with identical coupons and nozzle assemblies joined by previously known methods.

In view of the above, a cladding layer employed by the present invention can be seen as being a relatively low volume constituent of the weld joints between articles formed of different superalloys, and therefore does not significantly compromise the high temperature properties of the superalloys, particularly if the cladding layer is formed of the more weldable of the two superalloys being welded. The limited amount of cladding layer required also minimizes base metal dilution, while the manner in which the cladding layer is applied provides for consistency in thickness to control the level of compositional mixing through the depth of the weld joint. The limited thickness of the cladding layer can also significantly reduce the amount of heat required to form the weld joint, thereby reducing cracking caused by weld shrinkage. If the cladding layer is formed of the same material as the mating casting, the result is a welding operation performed on nearly identical alloys, yet is part of a fabrication process that produces an assembly combining different alloys. In the embodiment in which airfoils 14 formed of N5 are welded to bands 12 of GTD-222, forming a cladding layer 16 of GTD-222 on the faying surfaces of the airfoils 14 can produce joint strengths closely approximating that of GTD-222. In view of the above aspects of the invention, such a cladding layer is able to provide a more weldable interface and prevent solidification and strain age cracking in the N5 superalloy.

While the invention has been described in terms of a preferred embodiment, it is apparent that other forms could be adopted by one skilled in the art. Accordingly, the scope of the invention is to be limited only by the following claims.

What is claimed is:

1. A process of welding together two nickel-base superalloy articles formed of different nickel-base superaloys or of the same nickel-base superalloy but different microstructures, the articles having complementary faying surfaces, the process comprising the steps of:
   forming a cladding layer of a filler material on a faying surface of at least one of the articles;
   machining the cladding layer to promote mating of the faying surfaces of the articles;
   mating the faying surfaces of the articles;
   welding the faying surfaces of the articles together to produce a welded assembly; and then
   cooling the welded assembly, wherein after cooling the welded assembly is free of thermally-induced cracks.

2. A process as recited in claim 1, wherein the filler material has a composition that is different from the nickel-base superalloys of the articles.

3. A process as recited in claim 1, wherein the filler material is a superalloy.

4. A process as recited in claim 1, wherein the articles are formed of different nickel-base superalloys, and the filler material is formed of one of the different nickel-base superalloys.

5. A process as recited in claim 1, further comprising the steps of heat treating the welded assembly after the cooling step, and then cooling the welded assembly, the welded assembly remaining free of thermally-induced cracks after the heat treating and cooling steps.

6. A process as recited in claim 1, wherein at least one of the articles is formed of a gamma prime-strengthened nickel-base superalloy.

7. A process as recited in claim 6, wherein the articles have dissimilar microstructures.

8. A process as recited in claim 6, wherein the gamma prime-strengthened nickel-base superalloy contains at least three weight percent aluminum or titanium.

9. A process as recited in claim 8, wherein a second of the articles is formed of a second gamma prime-strengthened nickel-base superalloy containing less than three weight percent aluminum and less than three weight percent titanium.

10. A process as recited in claim 9, wherein the filler material is formed of the second gamma prime-strengthened nickel-base superalloy.

11. A process as recited in claim 9, wherein the filler material is formed of a non-gamma prime-strengthened nickel-base superalloy.

12. A process as recited in claim 9, wherein the filler material is formed of a superalloy that is not nickel based.

13. A process as recited in claim 1, wherein the articles are castings and the welded assembly is a turbine component of a gas turbine engine.

14. A process of welding together two gamma prime-strengthened nickel-base superalloy castings having complementary faying surfaces, the nickel-base superalloy of a first of the castings containing at least three weight percent aluminum or titanium, the nickel-base superalloy of a second of the castings containing less than three weight percent aluminum and less than three weight percent titanium, the process comprising the steps of:
   welding a cladding layer to the faying surface of at least one of the castings;
   machining the cladding layer to promote mating of the faying surfaces of the castings;
   mating the faying surfaces of the castings;
   welding the faying surfaces of the castings together to produce a welded turbine component of a gas turbine engine; and then
   cooling the welded turbine component, wherein after cooling the welded turbine component is free of thermally-induced cracks.

15. A process as recited in claim 14, wherein the cladding layer has a composition that is different from the nickel-base superalloys of the castings.

16. A process as recited in claim 14, wherein the cladding layer is a superalloy.

17. A process as recited in claim 14, further comprising the steps of heat treating the welded turbine component after the cooling step, and then cooling the welded turbine component, the welded turbine component remaining free of thermally-induced cracks after the heat treating and cooling steps.

18. A process as recited in claim 14, wherein a first one of the castings has a single-crystal microstructure and a second of the castings has a microstructure different from that of the first casting.

19. A process as recited in claim 14, wherein the cladding layer is formed of the nickel-base superalloy of the second casting.

20. A process as recited in claim 14, wherein the nickel-base superalloy of the first casting has a nominal composition, in weight percent, of 7.5% cobalt, 7.0% chromium, 6.5% tantalum, 6.2% aluminum, 5.0% tungsten, 3.0% rhenium, 1.5% molybdenum, 0.15% hafnium, 0.05% carbon, 0.004% boron, 0.01% yttrium, the balance nickel and incidental impurities, and the nickel-base superalloy of the second casting has a nominal composition, in weight percent, of about 22.5 chromium, about 14.0 cobalt, about 2.3 titanium, about 1.2 aluminum, about 2.0 tungsten, about 0.8 columbium, and about 1.0 tantalum, with the balance being nickel and incidental impurities.

21. A process as recited in claim 14, wherein the welded turbine component is a turbine nozzle assembly.

* * * * *

UNITED STATES PATENT AND TRADEMARK OFFICE
CERTIFICATE OF CORRECTION

| | |
|---|---|
| PATENT NO. | : 6,652,677 B2 |
| APPLICATION NO. | : 10/005009 |
| DATED | : November 25, 2003 |
| INVENTOR(S) | : Lyle B. Spiegel et al. |

It is certified that error appears in the above-identified patent and that said Letters Patent is hereby corrected as shown below:

Title Page, (75) Lyle B. Speigel should be

Lyle B. Spiegel

Signed and Sealed this

Seventeenth Day of July, 2007

JON W. DUDAS
*Director of the United States Patent and Trademark Office*